Figure 1:
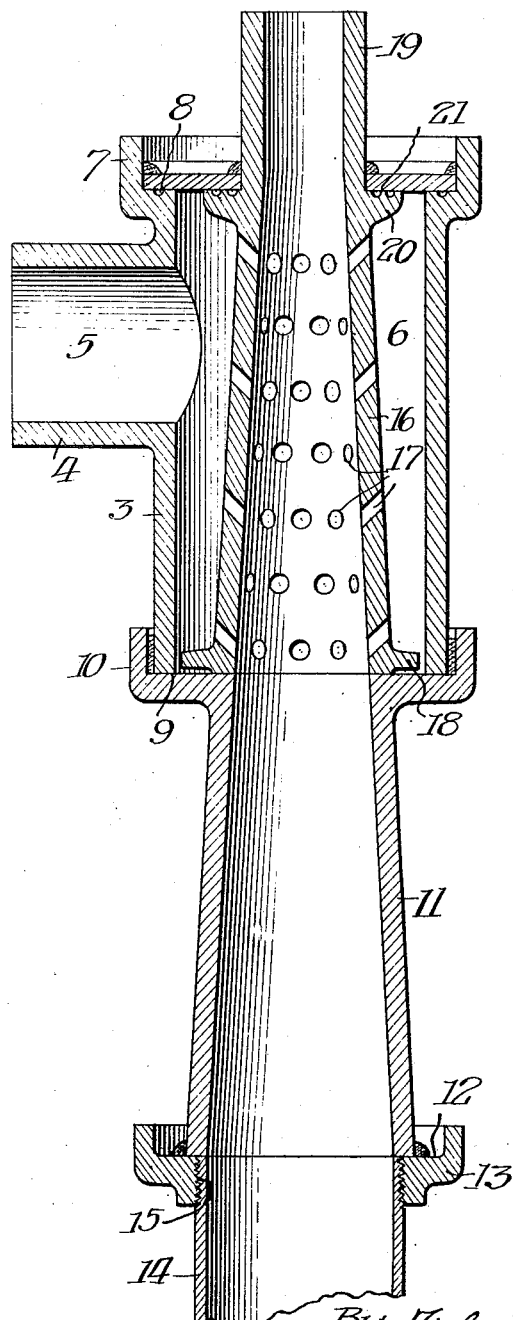

Feb. 18, 1930.  F. G. WHEELER  1,747,687

ABSORPTION METHOD AND APPARATUS

Filed Dec. 5, 1925

Inventor:
Frank G. Wheeler,
By Fisher, Fowle, Clapp & Soans,
Attys.

Patented Feb. 18, 1930

1,747,687

UNITED STATES PATENT OFFICE

FRANK G. WHEELER, OF APPLETON, WISCONSIN, ASSIGNOR TO BLEACH PROCESS COMPANY, OF NEENAH, WISCONSIN, A CORPORATION OF WISCONSIN

ABSORPTION METHOD AND APPARATUS

Application filed December 5, 1925. Serial No. 73,455.

This invention relates to a novel absorption method and apparatus or what may be termed an eductor or absorber adapted especially for effecting chemical union between a gas and a substance dissolved or suspended in a liquid. While it will be described in connection with the absorption of chlorine in milk of lime to produce chloride of lime, it is to be understood that the apparatus is not limited to such use.

Heretofore, it has been common in the art, especially in connection with condensers or other devices for moving a fluid, to employ a perforated wall or cone into and through which a jet, such as water under high pressure, was injected for the purpose of combining with another fluid body such as steam for moving or condensing said fluid body, but these structures or devices have been of such materials as to render them inapplicable for the uses of the present invention, especially in chlorine absorption or where the parts were exposed and subjected to the attack of corrosive gases or acids. In addition to being expensive and complicated in construction, they were provided with fine holes or nozzles which would easily plug or clog up and require constant attention and cleaning in order to maintain the same in an operative condition, even though inefficient, especially in their failure to create the proper suction, such as would render them efficient for absorption purposes.

Moreover, previous devices were not so constructed as to operate efficiently with liquor, whether a sludge, muddy or clear, or perhaps requiring special adjustment for fluids of different viscosity, specific gravity, etc. and such devices often resulted in a high-back pressure and inefficient operation, if not failure to operate at all, for their designed purpose.

With the foregoing in view, among the objects of the invention are to provide a novel absorption method and apparatus which will operate efficiently as an absorber due to the high efficiency of agitation, which obviates the necessity of employing a jet under high pressure and permits efficient operation by the employment of a stream of less pressure than a regular jet in order to properly exhaust and absorb the fluid material such as gas or other substances to be dissolved in a liquid and employs a fluid other than steam which is not condensed thus obviating the necessity of condensing where steam is used for the purpose of passing the same through the absorber as a liquid; to provide a novel method and apparatus which will absorb completely without corroding, clogging up or plugging; which will pass a large volume of liquor with the gas and which produces a violent agitation with efficient absorption and entry of the gas in the form of bubbles to effect intimate and thorough contact with the liquor so that the same is carried off in the form of froth instead of as a condensed fluid or liquid, and generally to improve and simplify the construction of apparatus of this character whereby the same may be economically manufactured, quickly renewed, easily knocked down or taken apart for any reason whatsoever, and which will prove efficient and dependable as well as prevent back pressure and overcome all of the objections previously noted.

The invention further consists in certain other novel features of construction and operation which will more readily appear in connection with the description and be particularly pointed out in the appended claims.

Figure 2:
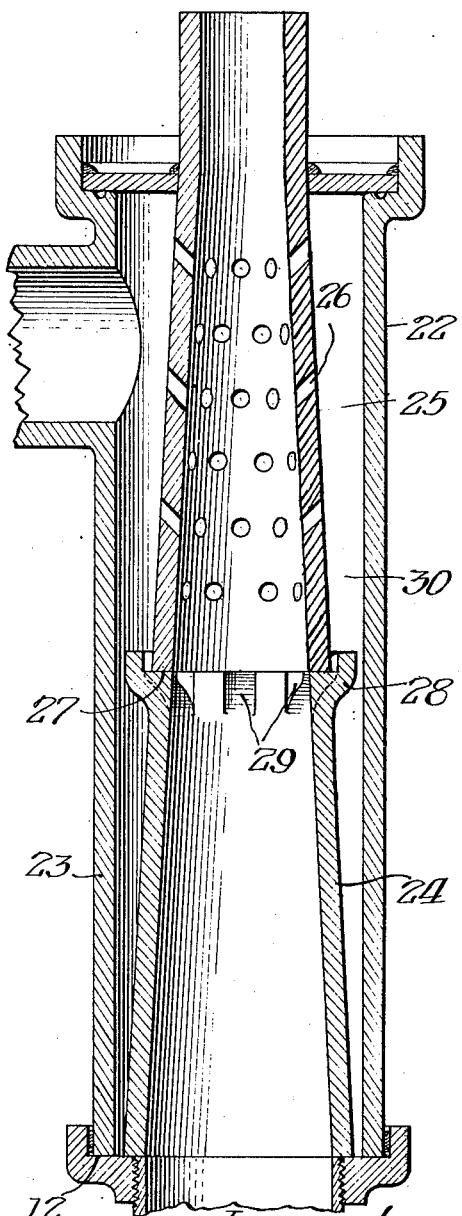

In the drawings Fig. 1 is a diametrical vertical, sectional view showing one form of my novel absorption apparatus for carrying out the method constituting a part of the invention, and Fig. 2 is a similar view of another form of the apparatus.

Referring to the drawings in detail, and particularly Fig. 1, the absorber or absorption apparatus embodies an upper section in the form of a T 3, preferably of earthenware, stoneware, or other vitreous materials, or may be of iron, lead, brass or other suitable material, depending upon the use to which the apparatus is put. This T has a lateral branch or inlet 4 near its upper end and of a cross section preferably less than that of the body of the T through which an unobstructed inlet passage 5 is provided into the chamber 6 of the T. The upper end of the upper section or T 3 which constitutes a surrounding outer wall forming a casing or chamber, as will be hereinafter more fully set forth, is provided with an angular outstanding annular flange 7 projecting upwardly therefrom to form an internal upwardly facing shoulder or seat 8 adapted for connection with the adjacent end of a wall or flange of a pipe or conduit leading thereto.

The T 3 seats at its lower end upon the outer portion of a shoulder 9 formed by an angular upstanding annular flange 10 at the reduced upper end of an imperforate conical base section 11 with which it is properly joined and sealed with suitable interposed packing, such as lead, if desired. The base 11 at its enlarged lower end rests upon a seat 12 formed by an annular flange 13 mounted or otherwise rigidly formed upon the upper end of a pipe 14, as indicated at 15.

Mounted upon the shoulder or seat 9 within the chamber or T 3 is an upper cone section or strainer 16 which is slightly tapered and may conform to the taper of the lower cone section or base 11, the taper being gradual and uniform. The section 16 has a plurality of rows of circumscribing or annular series of perforations 17 which are preferably inclined from their outer to their inner ends through the wall of the cone and are spaced apart longitudinally and circumferentially to prevent the entrance of excess gas. The upper cone section rests on the inner edge of the shoulder 9 so that its inner wall is in alignment with the inner wall of the imperforate lower cone section or base 11. Said lower end is preferably provided with an annular outstanding flange 18.

It is also explained that the shoulders or seats 8, 9 and 12 and the edges of the sections which fit the same, especially at the seats 9 and 12, are ground square to give a liquid-tight joint or seal. The upper portion of the cone 16 is extended above the T 3 as indicated at 19, and is of cylindrical form to a point in horizontal alignment with the shoulder 8. Immediately below this shoulder the cone 16 is provided with an annular flange 20 providing an upwardly facing shoulder 21 upon which a connecting pipe leading from a suitable source of supply for the liquid, such as milk of lime or lime water, rests. In practice, this connection is made with a tank of suitable dimensions containing lime water of the proper strength which is circulated by means of a suitable pump, such as a centrifugal pump, into the top of the cone at the neck portion or throat 19 and is discharged downwardly into and through the cone.

The branch inlet 4 is connected with a suitable source of gas supply such as chlorine from the cell room or otherwise, and the stream of lime water is admitted at the top of the cone at a fairly high rate of speed but not under sufficiently high pressure that it may be termed a jet, or a stream of fluid having sufficiently high initial pressure to be confined in a relatively dense column having a relatively fixed diameter for a distance induced by the pressure back of the stream and not following or being governed by the diameter or walls of a vessel through which the stream is projected. It is found that by pumping about two-hundred and fifty gallons a minute through a two inch throat at the top of the cone, the apparatus will easily draw one-hundred cubic feet of gas per minute from the cell room. The gas which enters this is chlorine of fifty per cent purity or better, and the residual gases are discharged from the bottom of the pipe 14 into a suitable receiver beneath which it is submerged or extends below the liquor in a tank about two feet, so that the pipe may be made of cast iron.

At first it was attempted to make a cone in which the liquor would not part from the side of the cone, forming a cavity, but would cling to the wall of the cone and reduce its speed in proportion to the cross section of the pipe diameter, using the cone with an absorbable gas different from steam in which there may be a considerable portion of the gas as a residue, since the stream is admitted at the top of the cone at a fairly high rate of speed, say from fifteen to thirty feet per second. If the cone had no perforations, this would reduce the speed by a proportion of at least four to one or one-fourth of the initial speed before it was discharged from the bottom of the cone and the liquor would not cavitate from the side of the cone but would cling to it and flow much slower. It was found in use that the speed of the stream of liquid at the top was not sufficient to maintain the speed to the bottom of the cone and that as the lime water was forced down through the throat and the chlorine gas was drawn by suction into the holes of the cone and absorbed by the liquid, the necessary gas was drawn in at the upper holes to continue down the discharge pipe but would force the liquor back through the lower holes so that the outer compartment between the cone and the T or shell was partially filled with liquid. By providing the holes only in the upper part of the cone and a few of them spaced apart substantially as shown and described, with a gradual taper to the cone and the lower part imperforate and with the angle of the wall of the cone substantially as shown, the liquor will cling to the sides of the cone so that its flow is only gradually retarded. As it tends to slow up in its flow down the cone, gas is admitted through each small hole or inclined aperture and as the liquor breaks its wall hold, the gas is drawn in and causes an eddy which whirls the gas into tiny bubbles, irrespective of whether the liquor is a sludge or slurry, muddy or clear. It is found that the tiny bubbles coming into intimate contact with a large surface of the liquor will cause complete and immediate absorption of the gas without corrosion, plugging or clogging as would happen with the use of a large number of very fine holes or nozzles.

The nozzle must be conical if it is to have more than one hole, to make room for the residual gases, but since the important feature is to maintain intense agitation at the point of gas entry, this is obtained by the breaking of the wall hold of the liquid. As the residual gases are held in the eddy, the liquor clings to the wall, to be again broken at another hole, and so on. The angle of the wall is less than enough to cause cavitation and there results the formation of eddies and the forcing of the residual gases along as froth.

By having the cone imperforate at the lower section or portion beyond the holes is to provide gas room, thereby preventing the liquor from discharging through the lower holes and permitting the absorber to work well and efficiently with an eighty per cent residue or with a twenty per cent residue. The agitation is sufficient and such that no absorbable gas is discharged at the end of the throat or cone, which should be and preferably is sealed by a few inches of liquor, at which point the residual gases escape. Furthermore, the velocity of the liquor at the top is sufficient to force the residual gases out of the seal and works efficiently without high back pressure. While more liquor is required, a large volume of liquor is passed with the gas of corresponding volume and complete absorption takes place in the eddies in the throat of the cone. The conditions are such as to create intense agitation and therefore efficient absorption without interfering with the flow to any appreciable extent.

In order to obtain efficient absorption the gas bubbles must be brought into contact with a large surface of liquor, that is, with small bubbles and an excess of liquor, efficient absorption is provided. The upper bubbles are whirled into the center of the stream and the lower bubbles formed at the holes of the cone follow nearer the wall of the cone or not so near the center, with the resultant formation of froth and good absorption.

The simplicity of the device permits convenient replacements where the action of the gas is corrosive. Since stoneware and other vitreous materials are preferably employed, the parts may be cheaply renewed, and if there is any scaling, this can be easily cleaned.

In the form of the invention shown in Fig. 2 of the drawings, a T 22 is employed which is of the same construction as the T 3 except that it is prolonged downwardly at 23 to rest upon the outer portion of the shoulder 12 around the imperforate or base cone section 24. The upper cone section 25 may have the flange 20 omitted but is provided with inclined openings 26 and rests at its lower end upon an upwardly facing seat or shoulder 27 formed at the upper end of the lower cone section 24 through the medium of an outwardly and upwardly extending flange 28 and internal lugs 29. This provides an annular chamber or space 30 between the cone sections and the wall of the T or shell 22. The operation and the carrying out of the method is the same in this form as that described in connection with Figure 1, the lower half of the cone in Fig. 1 taking the place of the lower half of the T or surrounding pipe in the structure shown in Fig. 2 and omitting a chamber around the lower portion of the cone in Fig. 1.

While I have shown and described my invention in a preferred form, I am aware that various changes and modifications may be made without departing from the principles of my invention, the scope of which is to be determined by the appended claims.

I claim as my invention:

1. An absorption apparatus including a downwardly enlarged strainer of conical formation and having means at its upper end adapted for connection with a source of liquid supply, such as milk of lime, for admission thereto in the form of a stream under pressure less than a jet, a wall around said strainer and forming an annular chamber therebetween, said wall having a lateral extension forming an inlet to the annular chamber for gas to be dissolved in the liquid, the strainer having one or more annular rows of inclined apertures relatively widely spaced for the admission of the gas thereto and into the stream in the form of bubbles under the suction of the stream in its flow through the strainer, the angle of the wall of the strainer being less than enough to cause cavitation.

2. An absorption apparatus including a downwardly enlarged strainer of conical formation and having means at its upper end adapted for connection with a source of liquid supply, such as lime water, for admission thereto in the form of a stream under pressure less than a jet, a wall around said strainer and forming an annular chamber therebetween, said wall having a lateral extension forming an inlet for gas to be dissolved in the liquid, the strainer having one or more annular rows of inclined apertures relatively widely spaced for the admission of the gas thereto and into the stream in the form of bubbles under the suction of the stream in its flow through the strainer, the lower portion of the strainer being enlarged uniformly with the upper portion and being imperforate, and an outlet connected with the lower end of the strainer.

3. In an absorber, a gradually tapered and downwardly enlarged conical strainer having a throat portion at its upper end adapted for connection with a supply of liquid other than steam, the upper portion of the strainer being provided with perforations relatively widely spaced apart substantially throughout its length and the lower portion of the strainer being imperforate, and a wall surrounding the perforate portion of the strainer and providing a chamber therebetween having an inlet at one side near its upper end and closed at its lower end, said strainer having the perforate and imperforate parts formed of independent sections, and a seat on the upper end of the imperforate part upon which the perforate part rests.

4. In an absorption apparatus, a sectional cone having a perforate upper portion corresponding to its smaller end and having an extended cylindrical portion of substantially uniform diameter for connection with a liquid inlet, and a chamber surrounding the perforate portion and provided with a reduced lateral inlet connected with a source of gas supply, the angle of the wall of the cone being less than enough to cause cavitation and adapted to gradually check the flow of the liquid down the cone whereby gas is drawn into the cone to commingle with the stream in the form of bubbles as the liquid breaks its wall hold around the perforations, resulting in an eddy which whirls the bubbles into intimate contact with a large surface of the liquid and intense agitation at the point of gas entry, thereby causing the gases to be carried off in the form of froth and complete absorption of the gases in the liquid.

5. The method of causing absorption of a gas by a liquid, consisting in inducing the flow of a gradually enlarging column of liquid at less pressure than jet pressure, surrounding said column of liquid with a body of the gas to be absorbed thereby, and admitting said gas to said column at spaced points without causing cavitation between the column and the body of gas, agitating the gas and the liquid in the column, and the gradually enlarging formation of the column compensating for increased pressure due to absorption of gas, but being less than would cause cavitation.

6. The method of causing absorption of a gas by a liquid, consisting in inducing the flow of a gradually enlarging column of liquid at less pressure than jet pressure and the gradually increasing cross-sectional area of the column being proportionate to increase of pressure caused by absorption of gas, and admitting said gas to said column with agitation but without causing cavitation between the column and the body of gas.

7. The method of chemically combining and causing absorption of a gas by a liquid, consisting in inducing the flow of liquid at less pressure than jet pressure through a confined space gradually increasing in size from the point of entrance of the liquid to the point of exit of the liquid, and without causing cavitation of the liquid at any point in the confined space, and admitting gas to said body of liquid without materially increasing the pressure in the space, or causing cavitation of the liquid, while highly agitating both the gas and the liquid.

8. Apparatus for effecting absorption of a gas by a column of flowing liquid, comprising a chamber into which the gas is admitted, a member in said chamber through which the liquid flows at less than jet pressure, and having a series of perforations therein to admit the gas to the column of liquid, and the cross-sectional area of said member from the point of entrance of the liquid to its point of discharge therefrom being gradually and proportionately increased to preserve a relatively constant pressure despite absorption of gas without inducing cavitation or causing the liquid to leave the walls of the member.

9. Apparatus for effecting absorption of a gas by a column of flowing liquid, comprising a chamber into which the gas is admitted, a frusto conical member in said chamber through which the liquid flows at less than jet pressure, and having a series of perforations therein to admit the gas to the column of liquid, other portions of said member having no perforations for admitting gas, and the cross-sectional area of said member from the point of entrance of the liquid to its point of discharge therefrom being gradually and proportionately increased to preserve a relatively constant pressure despite absorption of gas without inducing cavitation or causing the liquid to leave the walls of the member.

10. The method of causing absorption of a gas by a liquid comprising inducing the flow of a gradually enlarging column of liquid at less pressure than jet pressure, surrounding said column of liquid with a body of the gas to be absorbed thereby, and admitting said gas to said column at longitudinally and circumferentially spaced points without causing cavitation between the column and the body of gas, agitating the gas and the liquid in the column, and the gradually enlarging formation of the column compensating for increased pressure due to absorption of gas, but being less than would cause cavitation.

FRANK G. WHEELER.